(12) United States Patent
Fish et al.

(10) Patent No.: US 7,278,788 B2
(45) Date of Patent: Oct. 9, 2007

(54) AEROSLIDE BEARING CYLINDER

(75) Inventors: Elson B. Fish, Lakeville, IN (US); Steven J. Lubak, South Bend, IN (US)

(73) Assignee: Polygen Company

( * ) Notice: Subject to any disclaimer, the term of this patent is extended or adjusted under 35 U.S.C. 154(b) by 0 days.

(21) Appl. No.: 11/566,535

(22) Filed: Dec. 4, 2006

(65) Prior Publication Data

US 2007/0087147 A1  Apr. 19, 2007

Related U.S. Application Data

(63) Continuation of application No. 10/165,237, filed on Jun. 7, 2002.

(51) Int. Cl.
*F16C 29/02* (2006.01)

(52) U.S. Cl. .......................................... 384/42; 384/29
(58) Field of Classification Search ................ 384/26, 384/29, 42, 298; 156/174
See application file for complete search history.

(56) References Cited

U.S. PATENT DOCUMENTS

| 4,040,883 | A | * | 8/1977 | Matt et al. .................. 156/148 |
| 4,258,960 | A | * | 3/1981 | Harris ......................... 384/297 |
| 5,288,354 | A | * | 2/1994 | Harris et al. ................ 156/154 |
| 5,470,414 | A | * | 11/1995 | Harris et al. .................. 384/42 |

\* cited by examiner

*Primary Examiner*—Thomas R. Hannon
(74) *Attorney, Agent, or Firm*—Barnes & Thornburg LLP; Mark J Nahnsen

(57) ABSTRACT

A composite bearing cylinder includes an inner bearing surface having a resin matrix with fumed silica therein and having a filament material helically embedded in the resin matrix, a layer of the resin matrix being located at the inner bearing surface, the fumed silica in the resin matrix thereby contributing to the wear resistance of the inner bearing surface.

22 Claims, 3 Drawing Sheets

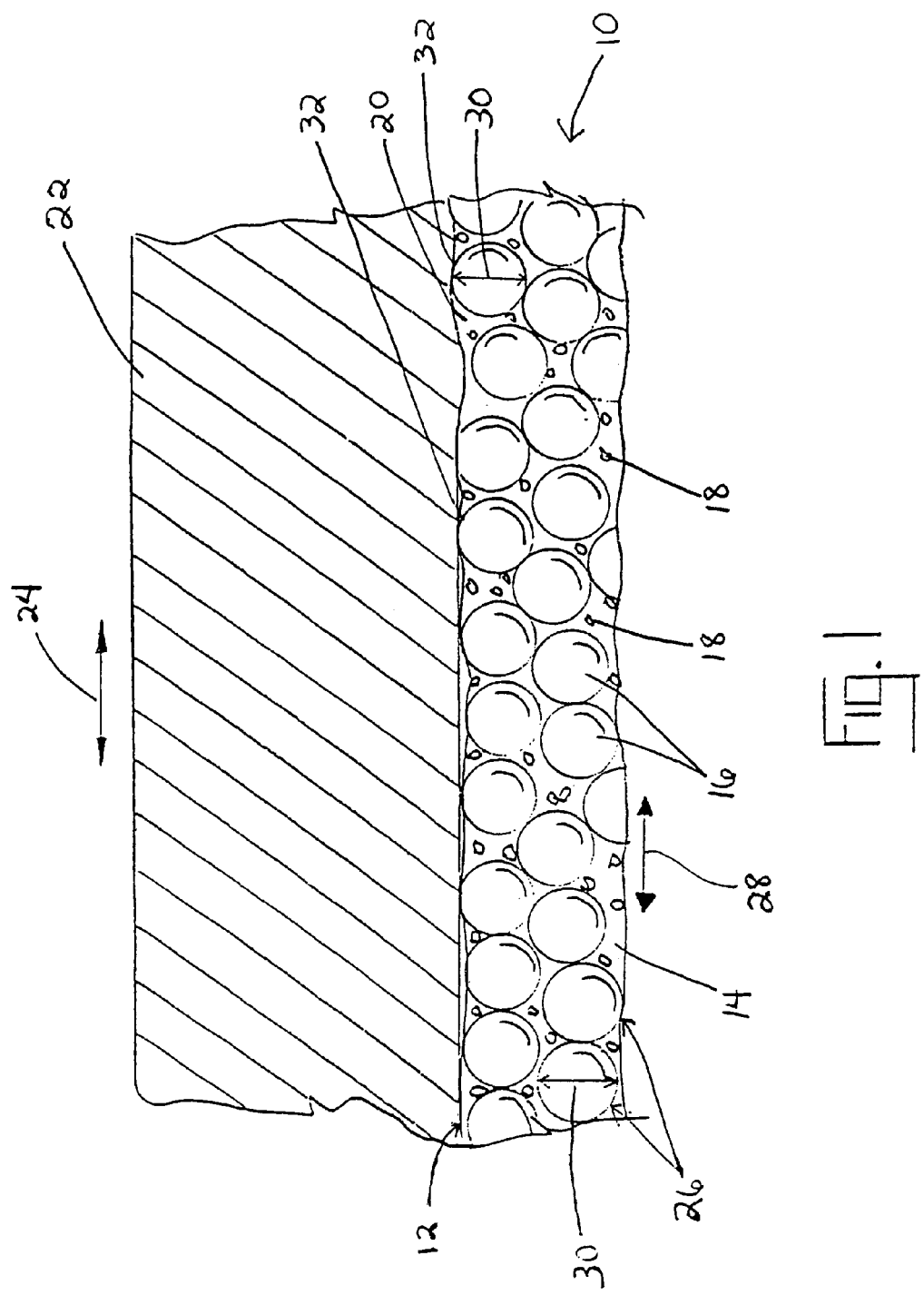

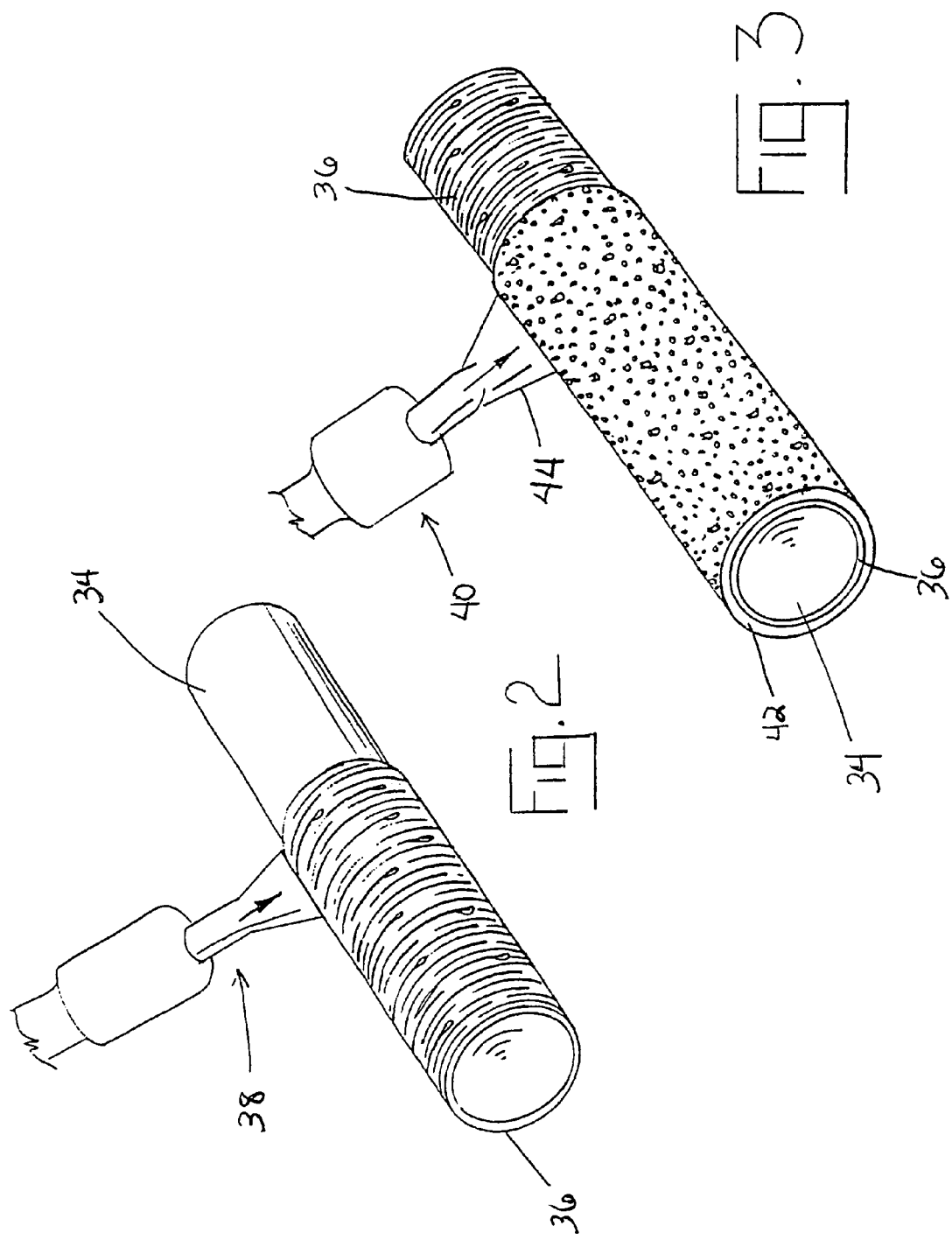

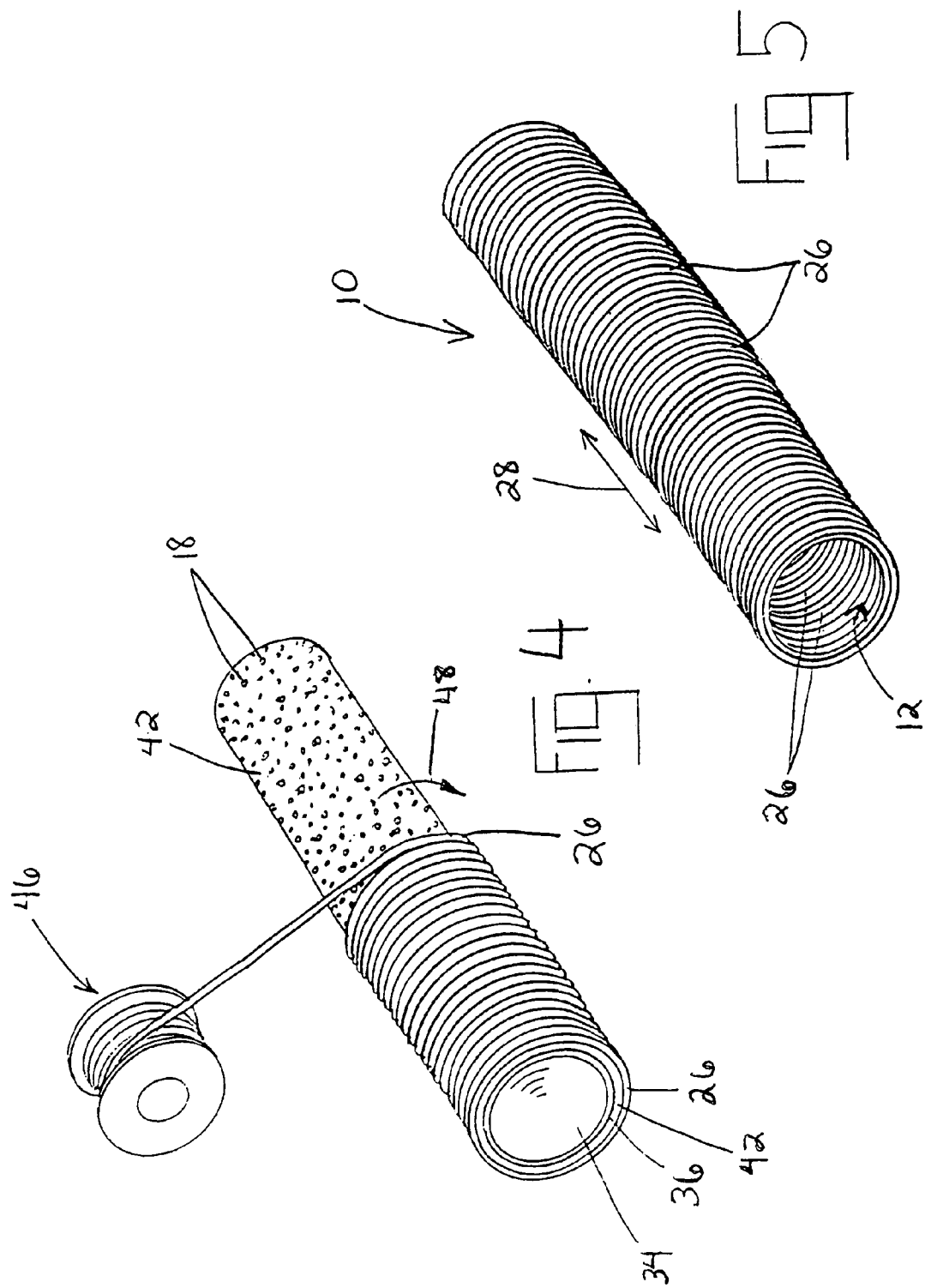

AEROSLIDE BEARING CYLINDER

This application is a continuation of and claims benefit of U.S. application Ser. No. 10/165,237 filed Jun. 7, 2002. The entire subject matter of U.S. application Ser. No. 10/165,237 is hereby incorporated by reference into the present application. This incorporation by reference includes, but is not limited to, the claims of the '237 application.

BACKGROUND OF THE INVENTION

1. Field of the Invention

The present invention relates to bearing members, and, in particular, cylinders have an inner bearing surface, and relates to a method of making such a cylinder.

2. Description of the Related Art

Cylinders having an inner bearing surface are well known in the art for use in hydraulic applications. Such cylinders have typically been made of, e.g., aluminum or steel.

Potential seal wear is a significant issue to consider with respect to cylinders. As discussed in "Variseal Design Guide" by American Variseal, two characteristics account for a majority of dry-contact friction between mating parts: adhesion and interlocking. As the area of contact between two surfaces increases, adhesion therebetween can also increase. Consequently, a smoother surface finish tends to promote greater contact and, thus, greater adhesion between adjoining surfaces.

Interlocking, conversely, is a product of the presence of surface irregularities on at least one of two adjoining surfaces, the peaks of such irregularities tending to shear when another surface is slid thereover. When a hard, rough surface is engaged with a softer material the peaks of the harder material tend to penetrate into the surface of the softer material, resulting in interlocking friction therebetween. Thus, to minimize friction, adjoining surfaces should be smooth enough so as to have little or no surface irregularities to reduce the potential for interlocking therebetween yet not be so smooth so as to significantly promote adhesion therebetween.

Current technology employs a gel coat to provide a smooth bore surface in composite pneumatic and hydraulic cylinders. However, there are various drawbacks associated with the use of such a gel coat. First, since such a gel coat is usually applied via spraying, volatile matter is typically a by-product that must be accounted for and cost becomes a concern as spraying processes can be expensive, especially if volatile matter need be recovered. Furthermore, gel-coated bores tend to have a significant coefficient of friction associated therewith, even though lower than that of untreated bores. Additionally, tests have shown after being exposed to a high number of cyclings (e.g., 1 million), gel-coated cycles can have a considerable amount of fairly hard, gum-like material developed in the seal region. Other tests have shown that after even 100,000 cycles, a gel coat on a bore can show signs of cracking and blistering.

What is needed in the art is a bearing cylinder with an optimized inner bore finish that is both as rough and hard (i.e., wear resistant) as possible, and that will not "dig" into any adjoining part while still meeting maximum leakage and wear requirements.

SUMMARY OF THE INVENTION

The present invention relates to a composite bearing cylinder with an inner bearing surface having a resin matrix with fumed silica therein and having a filament material helically embedded in the resin matrix, a layer of the resin matrix being located at the inner bearing surface, the fumed silica in the resin matrix thereby contributing to the wear resistance of the inner bearing surface.

The invention comprises, in one form thereof, a composite bearing cylinder having an inner bearing surface. The composite bearing cylinder includes a resin matrix and a substantially continuous filament material embedded therewithin. The resin matrix is composed of a resin material having fumed silica therein. A layer of the resin material is located at the inner bearing surface.

The present invention comprises, in another form thereof, a method of producing a bearing cylinder having an internal bearing surface. The method includes the steps of providing a mandrel and providing a source of a resin material. The resin material has fumed silica therewithin. The resin material is applied on the mandrel, thereby resulting in a resin-covered mandrel. A source of continuous filament material is provided. An amount of the continuous filament material is wound on the resin-covered mandrel to form a circumferential filament layer on the mandrel. A first portion of the resin material forms a bearing layer between the mandrel and the circumferential filament layer. A second portion of the resin material squeezes around the continuous filament material. The bearing layer has a wear resistance imparted thereto due to the fumed silica within the resin material. The resin material is cured after the winding step to thereby form a filament-wound bearing cylinder around the mandrel. The mandrel is removed from within the filament-wound bearing cylinder.

An advantage of the present invention is that the film of the resin material that remains at the inner bearing surface is highly wear resistant due to the presence of fumed silica (about 8%, by weight) therein.

Another advantage is that fumed silica has thixotropic properties that cause it to promote the filling of any potential hair line cracks that may form in the bore surfaces of larger cylinders (1.5" diameter and above).

A further advantage is that fumed silica has the ability to reinforce and/or increase the cohesive strength of a solid system at additions of about 2 to 5%.

A yet further advantage is that the resin paste system offers substantial versatility, permitting the incorporation of other materials (such as polytetrafluoroethylene to lower friction and fine ground silica for increasing hardness) that enhance the performance properties of the inner bore surface of the cylinder.

An even yet further advantage is the inner bore surface of the cylinder has decreased adhesion friction and minimal, if any, interlocking friction associated therewithin, allowing for a surface finish of 25 .mu. in Ra or greater.

An even further advantage is that the round/hard glass fiber windings, located at or near the inner bore surface and oriented transversely to the cylinder axis (and thus to the primary direction of movement of a part within the cylinders), allow a moving part within the bearing cylinder to "slide over" a round surface of a given glass-fiber winding.

An additional advantage is that no machining and/or grinding of the inner bore surface of the bearing cylinder is required, obviating the potential for tool mark creation therein.

A yet additional advantage is that the composite bearing cylinder is versatile in that it can be used in hydraulic situations where the hydraulic fluid is not oil but some other (even corrosive) fluid such as water and in that it can be designed to operate at pressures of at least 3000 psig.

An even further advantage is that the bearing cylinder is composed of dielectric materials, thereby permitting a less costly magnetized piston to be easily used in position sensing devices.

A yet additional advantage is that the bearing cylinder can be made to almost any color or can be made to be at least partially translucent. By being made at least partially translucent, visual positioning observance and/or optical sensing is facilitated.

An even yet further advantage is that, if for some reason the pressure exceeds the operating pressure and approaches the burst pressure, the bearing cylinder will normally allow fluid to weep through the wall at approximately 80% of the burst pressure, therefore potentially preventing catastrophic failure.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a partial, cross-sectional view of a piston operatively contacting a portion of an embodiment of the composite cylinder bearing of the present invention;

FIGS. 2-4 illustrate a series of steps used in producing the composite cylinder bearing of the present invention; and FIG. 5 is a perspective view of a completed composite cylinder bearing produced by employing the steps illustrated in FIGS. 2-4.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawings, and more particularly to FIG. 1, there is shown an AeroSlide composite bearing cylinder 10 having an inner bearing surface 12. Composite bearing cylinder 10 generally includes a resin matrix 14 with a continuous filament material 16 and, optionally, a plurality of particulate additives 18 embedded therein.

Resin matrix 14 is composed of a resin material having fumed silica (commonly sold under the trade name "Cab-O-Sil") therein. Advantageously, 2% to 10% (by weight) thereof is employed with about 8% fumed silica being preferred. An inner bearing layer 20 of resin matrix 14 exists at inner bearing surface 12, thereby greatly, due to the hardness imparted thereto by the fumed silica present therein, increasing the wear properties thereof. The resin material may be made to be either translucent or colored, as desired. Translucence permits optical monitoring of the operation of piston 22 within composite bearing cylinder 10, while coloring possibly improves the aesthetic quality thereof.

Continuous filament material 16 is helically embedded within resin matrix 14 to thereby add to the toughness (i.e., durability) of composite bearing cylinder 10. Composite bearing cylinder 10 is configured for operatively receiving a piston 22 therein, piston 22 being capable of moving a piston movement direction 24. To accommodate such movement of piston 22, composite bearing cylinder 10 has an associated primary bearing direction 26 that is parallel to piston movement direction 24. Continuous filament material 16 is wound so to form a plurality of filament windings 26 that are substantially perpendicular to primary bearing direction 26.

Advantageously, filament windings 26 each have a round filament cross-section 28, thereby forming a series of rounded filament surfaces 32 at or near inner bearing surface 12. Inner bearing layer 20 of resin matrix 14 and the series of rounded filament surfaces 32 at or near inner bearing surface 12 together actually define the totality of inner bearing surface 12. Rounded filament surfaces 32 promote the ease of passage of piston 22 over inner bearing surface 12 and thereby aid in friction reduction. In fact, the combination of the fumed silica in resin matrix 14 and rounded filament surfaces 32 permits the surface finish of inner bearing surface 12 to be an arithmetic average roughness (Ra) of about 25 .mu.in or greater, whereas normal metallic or gel coated cylinders specify an Ra of less than 10 .mu.in.

Advantageously, continuous filament material 16 is a fiberglass material. Fiberglass offers advantages of good hardness, generally good durability, a round cross-section and translucency. Translucence can be desirable in a situation when it is desirable to optically monitor the operation of piston 22 within composite bearing cylinder 10. Conversely, fiberglass composite is a material that can be readily colored to a variety of different colors and shades, thereby permitting composite bearing cylinder 10 to instead be colored, if desired.

Some possible choices for particulate additives 18 are polytetrafluoroethylene (PTFE), glass beads, fine ground silica, etc. or a combination thereof. PTFE, commonly sold under the trade mark "Teflon", helps reduce friction. Glass beads each offer a rounded surface (i.e., reduced friction) and good hardness (i.e., increased wear resistance). Fine ground silica helps increase hardness.

FIGS. 2-5 together illustrate various steps in the production of composite bearing cylinder 10, including a perspective view of the finished product (FIG. 5). As set forth in FIG. 2, a highly polished mandrel 34 is provided to act as a mold for inner bearing surface 12. Mandrel 34 advantageously has an arithmetic average roughness (Ra) of no more than about 10 .mu.in. To help achieve the desired level of roughness and promote easy release thereof from the finished product, mandrel 34 is chrome plated.

To further aid in the release thereof from the finished product, mandrel 34, as shown in FIG. 1, is desirably initially coated with a release agent 36 supplied by a release agent applicator 38 (shown schematically). Additives can be provided within release agent 36 that will adhere to inner bearing surface 12 and ultimately help reduce the friction associated therewith. PTFE can, for example, be used as such an additive.

In FIG. 3, a resin source 40 of an appropriate resin material 42 and an associated resin applicator 44 are provided. Resin applicator 44 is advantageously a trowel applicator, permitting the application of a controlled, even thickness of resin material 42 on mandrel 34. Resin material 42 is applied, desirably in a form of a paste, upon mandrel 34. Resin material 42 is troweled substantially evenly over entire mandrel 34, preferably to a thickness of about ⅛ inch.

As illustrated in FIG. 4, a filament source 46 of continuous filament material 16 is supplied and via which filament windings 26 that are formed substantially transversely of primary bearing direction 26. (Mandrel 34 could be rotatably driven, as schematically shown via arrow 48, to promote the winding of continuous filament material 16 thereon.) Filament windings 26 displace and otherwise become embedded in resin material 42 during this step. After a suitable number of filament windings 26 have been formed along the entire length of mandrel 34 in resin material 42, continuous filament material 16 is cut (not shown) and, desirably, excess resin material 42 is wiped (not shown) from the outside of now-formed composite bearing cylinder 10 before resin material 42 has an opportunity to cure.

Once resin material 42 cures, mandrel 34 is then removed from composite bearing cylinder 10 to reveal the finished product shown in FIG. 5.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combination piston and composite bearing cylinder comprising,
    a continuous inner bearing surface,
    the inner bearing surface defining a primary bearing direction along an axis of the cylinder,
    a piston having a surface for movement along the continuous inner bearing surface in the primary bearing direction,
    a resin matrix composed of a resin material having fumed silica therein, the resin material at least partially at the inner bearing surface, the fumed silica providing wear resistance to the continuous inner bearing surface, and
    a substantially continuous filament material embedded within the resin matrix, the substantially continuous filament material including a round cross-section, the substantially continuous filament material forming a plurality of substantially rounded filament surfaces at said continuous inner bearing surface.

2. The combination piston and composite bearing cylinder of claim 1 whereby the resin comprises about 2% to 8% by weight fumed silica.

3. The combination piston and composite bearing cylinder of claim 1 wherein the inner bearing surface is not machined or ground.

4. The combination piston and composite bearing cylinder of claim 1, wherein said resin matrix further contains a plurality of particulate additives, said particulate additives being at least one of polytetrafluoroethylene, glass beads and ground silica.

5. The combination piston and composite bearing cylinder of claim 1, wherein said continuous inner bearing surface includes a substantially continuously curved contour.

6. The combination piston and composite bearing cylinder of claim 1, wherein the substantially transverse substantially rounded filament surfaces are oriented substantially perpendicular to the primary bearing direction.

7. The combination piston and composite bearing cylinder of claim 1 wherein the resin matrix further includes ground silica.

8. The combination piston and composite bearing cylinder of claim 1 wherein the fumed silica promotes filling of hair line cracks that form in the continuous inner bearing surface of larger diametered cylinders.

9. The combination piston and composite bearing cylinder of claim 1 wherein decreased adhesion friction produced at the continuous inner bearing surface allows an arithmetic average surface roughness of 25 µin and greater.

10. The combination piston and composite bearing cylinder of claim 1, wherein the bearing cylinder includes dielectric material.

11. The combination piston and composite bearing cylinder of claim 1, wherein the bearing cylinder is at least partially translucent.

12. The combination piston and composite bearing cylinder of claim 1 including color additives in the resin matrix.

13. A combination piston and composite bearing cylinder comprising,
    a composite bearing cylinder comprising:
    a continuous inner bearing surface;
    the inner bearing surface defining a primary bearing direction along an axis of the cylinder;
    a resin matrix composed of a resin material having fumed silica therein, the resin material at least partially at the inner bearing surface, the fumed silica providing wear resistance to the continuous inner bearing surface;
    a substantially continuous filament material embedded within the resin matrix, the substantially continuous filament material including a cross-section having a substantially rounded filament surface, the substantially continuous filament material forming a plurality of substantially rounded filament surfaces at the continuous inner bearing surface, the plurality of substantially rounded filament surfaces at the continuous inner bearing surface and a portion of the resin material forming the continuous inner bearing surface, and
    a piston having a surface for movement along the continuous inner bearing surface in the primary bearing direction.

14. The combination piston and composite bearing cylinder of claim 13, wherein said resin material includes between about 2% (by weight) to about 10% of said fumed silica.

15. The combination piston and composite bearing cylinder of claim 13 wherein the inner bearing surface is not machined or ground.

16. The combination piston and composite bearing cylinder of claim 13, wherein said resin matrix further contains a plurality of particulate additives, said particulate additives being at least one of polytetrafluoroethylene, glass beads and ground silica.

17. The combination piston and composite bearing cylinder of claim 13, wherein said continuous inner bearing surface includes a substantially continuously curved contour.

18. The combination piston and composite bearing cylinder of claim 13 wherein decreased adhesion friction produced at the continuous inner bearing surface allows an arithmetic average surface roughness of 25 µin and greater.

19. The combination piston and composite bearing cylinder of claim 13, wherein the bearing cylinder includes dielectric material.

20. The combination piston and composite bearing cylinder of claim 13, wherein the bearing cylinder is at least partially translucent.

21. The combination piston and composite bearing cylinder of claim 13 including color additives in the resin matrix.

22. A combination piston and composite bearing cylinder comprising, a composite bearing cylinder comprising:
    a continuous inner bearing surface;
    an outer surface radially opposed to said continuous inner bearing surface;

a resin matrix composed of a resin material having fumed silica therein providing hardness and wear resistance to said continuous inner bearing surface, said resin material at least partially comprising said inner bearing surface; and a substantially continuous filament material embedded within said resin matrix, said substantially continuous filament material including a cross-section having a circular filament surface, said substantially continuous filament material forming a plurality of circular filaments at said continuous inner bearing surface, said plurality of circular filaments at said continuous inner bearing surface and a portion of said resin material forming said continuous inner bearing surface, and a piston having a surface for movement along the continuous inner bearing surface in the primary bearing direction.

* * * * *